United States Patent [19]
Fryer

[11] 3,751,980
[45] Aug. 14, 1973

[54] LOW POWER ELECTROMAGNETIC FLOWMETER PROVIDING ACCURATE ZERO SET

[75] Inventor: Thomas B. Fryer, Saratoga, Calif.

[73] Assignee: The United States of America as represented by the Administrator of the National Aeronautics and Space Administration, Washington, D.C.

[22] Filed: Nov. 12, 1971

[21] Appl. No.: 198,289

[52] U.S. Cl............................ 73/194 EM, 128/2.05 F
[51] Int. Cl............................ G01f 1/00, A61b 5/02
[58] Field of Search........................... 73/194 EM; 128/2.05 F

[56] References Cited
UNITED STATES PATENTS
2,729,103  1/1956  Raynsford et al............ 73/194 EM
3,184,966  5/1965  Thornton et al............. 73/194 EM
3,316,762  5/1967  Westersten.................. 73/194 EM OTHER PUBLICATIONS
Denison, Jr. et al.–Circulation Research–Vol. III, Jan. 1955, pp. 39–46.

Primary Examiner—Charles A. Ruehl
Attorney—Darrell G. Brekke, John R. Manning et al.

[57] ABSTRACT

A low power, small size electromagnetic flowmeter system is provided which produces a zero output signal for zero flow. The system comprises an air core type electromagnetic flow transducer, a field current supply circuit for the transducer coils and a pre-amplifier and demodulation circuit connected to the output of the transducer. To prevent spurious signals at zero flow, separate, isolated power supplies are provided for the two circuits. The demodulator includes a pair of synchronous rectifiers which are controlled by signals from the field current supply circuit. Pulse transformers connected in front of the synchronous rectifiers provide isolation between the two circuits.

9 Claims, 10 Drawing Figures

LOW POWER ELECTROMAGNETIC FLOWMETER PROVIDING ACCURATE ZERO SET

ORIGIN OF THE INVENTION

The invention described herein was made by an employee of the United States Government and may be manufactured and used by or for the Government for Governmental purposes without the payment of any royalties thereon or therefor.

FIELD OF THE INVENTION

The present invention relates to electromagnetic flowmeters used in measuring blood flow and, more particularly to a small size, low power electromagnetic flowmeter which provides accurate zero set.

BACKGROUND OF THE INVENTION

The measurement of blood flow is now well established as providing an important factor in evaluating cardiovascular activity. Generally speaking, the only two methods which have found universal acceptance for flow studies in man or chronic animal preparations have been Doppler (pulsed or continuous wave) techniques and electromagnetic techniques. Electromagnetic techniques provide a number of advantages regarding accuracy and reliability but suffer one disadvantage that is not generally experienced with Doppler systems. Specifically, while doppler systems have been recommended on the basis of accurate zero flow determinations, electromagnetic systems universally exhibit an unsatisfactory zero set. To explain, rather than provide a zero reading for zero blood flow, all electromagnetic systems of the piror art actually produce some non-zero signal under these circumstances. It will, of course, be appreciated that it is necessary that the system provide a zero reading for zero blood flow and hence all previous systems concerned with this problem have employed some scheme to enable calibration for zero flow. With such systems, it is necessary to re-calibrate every time a different artery size is measured and, in actual usage, it is often quite difficult to achieve zero blood flow for calibration purposes.

SUMMARY OF THE INVENTION

In accordance with the invention a small size, low power electromagnetic flowmeter is provided which, among other features, produces a zero output signal for zero actual flow.

According to a presently preferred embodiment thereof, the system of the invention comprises an electromagnetic flow transducer, a transducer coil excitation circuit for the coils of the flow transducer and an amplication and demodulation circuit for converting the detected signal at the electrodes of the transducer into an appropriate analog measurement of flow. The invention involves the important appreciation that spurious signals produced at zero flow by prior art electromagnetic flowmeters are caused by undesirable coupling between the transducer coil excitation circuit and the transducer electrode circuit and to prevent this, separate power supplies are provided for the two circuits. In order to provide accurate sampling of the output signal from the transducer electrodes after appropriate conditioning in a pre-amplifier, sampling is synchronized with the input wave to the transducer coils. To eliminate coupling between the coil and electrode circuits pulse transformers are connected between the synchronizing outputs of the coil supply circuit and the synchronous rectifiers used in demodulating the electrode-derived signals.

The field current supply circuit for the transducer coils preferably comprises an astable multivibrator, and a bistable multivibrator for dividing the output of the astable multivibrator by two, the resultant square wave output being connected to a transducer coil through a corresponding power amplifier. The synchronizing signals are derived by AND-gates having inputs connected to 180° phase separated outputs of the multivibrators. The use of a bistable multivibrator connected after the astable multivibrator improves the symmetry of the square wave and in cooperation with the use of an air core type transducer, aids in providing accurate zero set.

Other features and advantages of the invention will be set forth in, or apparent from, the detailed description of a preferred embodiment found hereinbelow.

DESCRIPTION OF THE PREFERRED EMBODIMENTS

Figure 1:
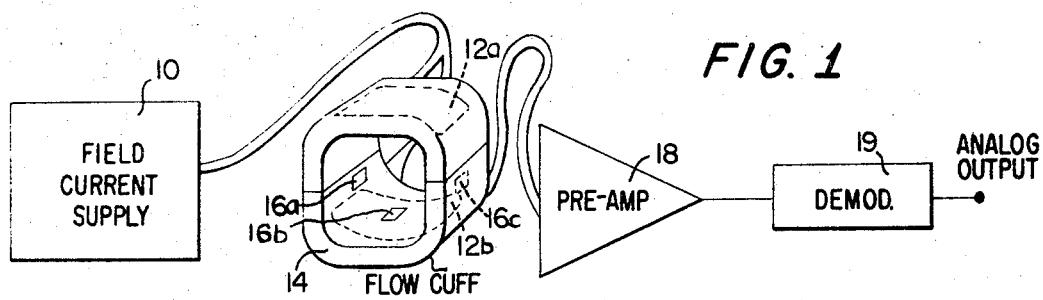
FIG. 1 is a schematic block diagram illustrating the basic components of an electromagnetic flowmeter in accordance with the invention.

Referring to FIG. 1, a block diagram of the basic elements of an electromagnetic flowmeter system is shown. In general, the circuitry required for an electromagnetic flowmeter serves two principle functions. Firstly, referring to FIG. 1, the circuitry includes a field current supply source 10 which supplies an alternating current, of square wave form in the present instance, to the field coils 12a and 12b of a transducer or flow cuff 14 so that a suitable magnetic field is generated in the area of the artery or vessel for which blood flow is to be measured. Flow cuff 12 is preferably an air core flow transducer of a commercially available type. Reference is made to the article entitled "Square-wave Electromagnetic Flowmeter Employing Commercially Available Recorder" by Scher et al., appearing in the *Journal of Applied Physiology* 18:1265-1267, 1963, for a discussion of such transducers. Secondly, the circuitry must also provide amplification and demodulation of the low power signal from the pick-up electrodes 16a, 16b and 16c (See also FIG. 2) of transducer 14 so as to provide an analog voltage proportional to the flow being measured and to this end, an amplifier 18 is connected to the electrodes 16a, 16b and 16c and a demodulator 19 is connected to the output of the amplifier. As indicated, demodulator 19 produces an analog output which is a measure of the blood flow rate.

It is noted that, as mentioned, a square wave form type of magnetic coil excitation is preferred in that such a technique appears to provide a better potential for accurate zero determination compared to other modulation schemes such as sine wave, gated sine wave and trapezoidal wave and is better suited to low power operation.

Figure 3A:
FIGS. 3(a) to 3(h) are voltage wave forms at various points in the circuit of FIG. 2.
Figure 3B:
Figure 2:
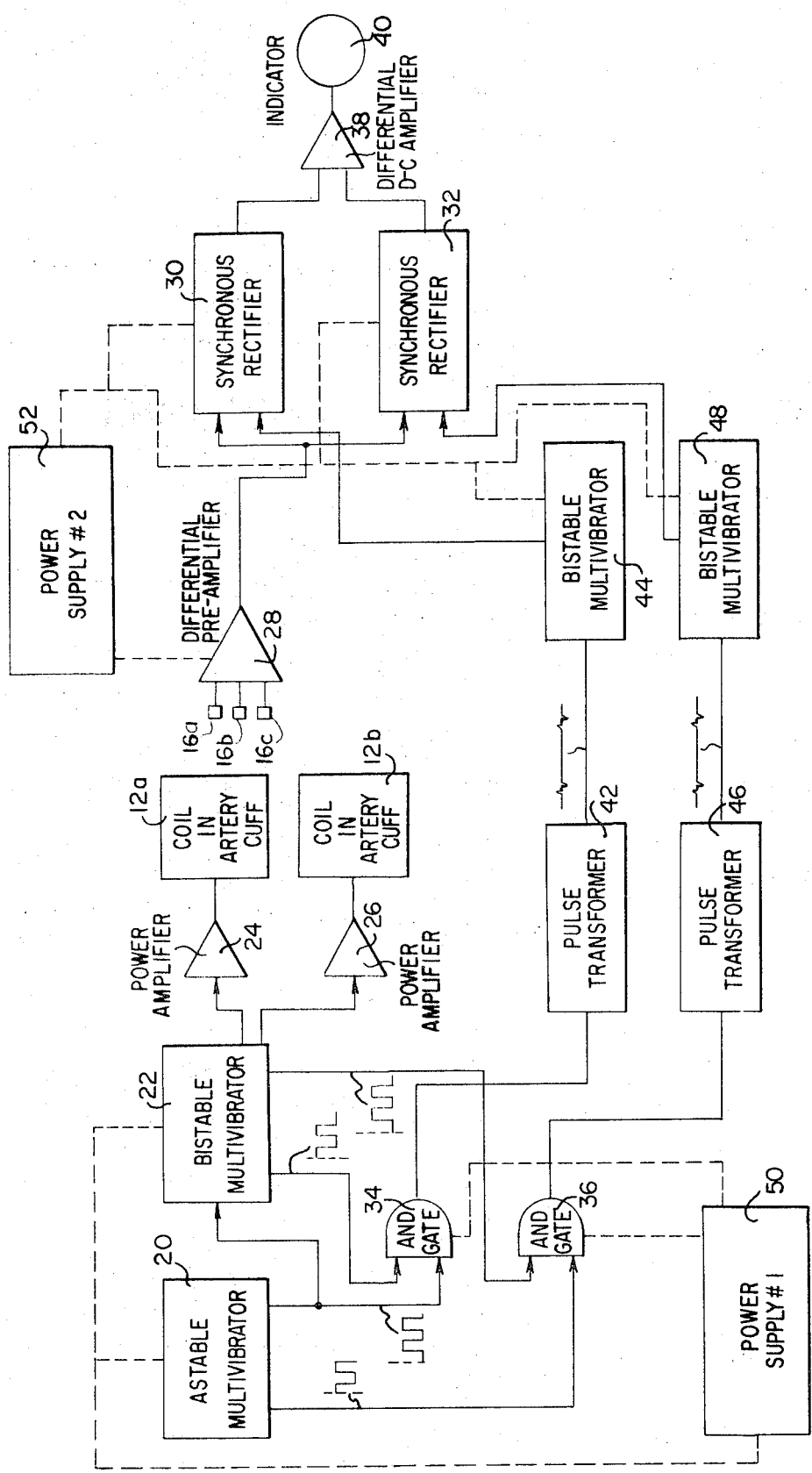
FIG. 2 is a block circuit diagram of a presently preferred embodiment of an electromagnetic flowmeter in accordance with the invention.

Referring to FIG. 2, a more detailed block diagram of the electromagnetic flowmeter of the invention is shown. A conventional astable multivibrator 20 provides a square wave signal having a typical frequency of 600Hz. It will be understood that the values given are to be interpreted as exemplary rather than limiting and, for example, frequencies from 300 Hz to 1,600 Hz have been used successfully. The wave form at the output of astable multivibrator 20 is indicated in FIG. 3(a). The output of astable multivibrator 20 is connected to a bistable multivibrator 22. The use of a basic oscillator in the form of astable multivibrator 20 together with the provision of binary division by two of the output of the astable multivibrator produces two important results. Firstly, such an approach ensures a degree of symmetry of the square wave that is difficult to obtain with an astable multivibrator alone, even with adjustment of critical components. For example, a component tolerance of ±10 percent is permissible with the scheme shown and yet a high degree of symmetry is provided. Secondly, the arrangement also provides the necessary quadrature gating signals required in demodulator 19 as discussed below. The division by two performed by bistable multivibrator 22 provides a typical field core frequency of about 300 Hz for the values discussed.

Figure 3C:
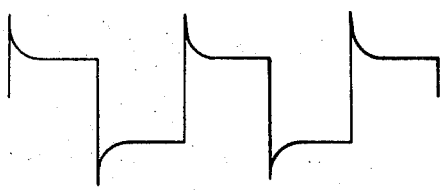

The output of bistable multivibrator is connected to first and second power amplifiers 24 and 26 which drive field coils 12a and 12b, respectively. The voltage wave form at the field coils 12a and 12b is indicated in FIG. 3(c), the switching transients being a result of the inductance of the field coils. As mentioned hereinabove, an air core type of flow cuff is preferred for transducer 14 because of the relative high degree of zero stability provided thereby. In this regard, it is noted that the switching transient shown in FIG. 3(c) dies out much more rapidly with this type of transducer than with iron core transducers.

The completely on and off switching mode of operation for power amplifiers 24 and 26 results in a highly efficient operation that conserves battery power. To maximize this efficiency, the power transistors (not shown) in amplifiers 24 and 26 are selected to have a very low impedance when switched on. For this reason, 2N5190 and 2N5193 transistors have been used, these transistors having less than 0.1 volt drop when a maximum field coil current of 1 ampere is used.

Figure 3D:
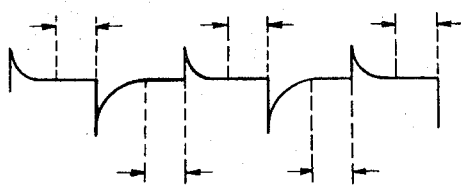

The electrodes 16a, 16b and 16c of flow cuff 14 are connected to a differential pre-amplifier 28. Pre-amplifier 28 can take a number of forms and preferably is a low noise amplifier of the type originally designed for use with EKG and EEG signals. Capacitor coupling between the stages of the pre-amplifier is used to eliminate polarization potentials, values being selected so that the low frequency response extends to 1 Hz or less. Pre-amplifier 28 preferably has a gain of 1,000 since experimental measurements have demonstrated that the pre-amplifier potentials were less than 300µV peak-to-peak. This gain was sufficient to amplify the 25 to 35µV maximum input signals for the demodulator but not large enough to cause overloading by the polarization potentials. It should be emphasized that care should be taken to prevent polarization potentials from overloading the pre-amplifier in that such overloading could charge the coupling capacitors mentioned above and block operation of the pre-amplifier 28. The possibility of overload can be kept at a minimum by providing A.C. coupling between the flow signal at the input and between the first and second stages of amplification where the gain is low. The wave form of the output of pre-amplifier 28 is indicated in FIG. 3(d).

Figure 3E:
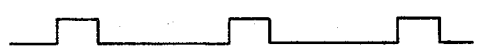
Figure 3F:

The output of pre-amplifier 28 is demodulated by an arrangement including first and second synchronous rectifiers 30 and 32. As indicated in FIG. 3(d), the pre-amplifier output signal includes typical transformer transients and these will die out to a steady state value within 0.5 msec. when using an air core type transducer. Steady state values are obtained by sampling the last half of each of the positive and negative excursion. To this end first and second AND gates 34 and 36 are provided each having one input connected to the output of astable multivibrator 20 and the other input connected to the output of bistable multivibrator 22 as shown. The wave forms at the various multivibrator outputs are indicated schematically in FIG. 2 whereas FIG. 3(e) and FIG. 3(f) indicate the voltage wave forms at the output of AND gates 34 and 36, respectively. Synchronous rectifier 30 includes a field effect transistor (FET) which is not shown and which is gated synchronously to one direction of the field whereas synchronous rectifier 32 similarly includes a FET (not shown) gated to the other. The voltage level of the pre-amplifier 28 is transferred to a capacitor (not shown) during the gating interval and is held between sampling. The output voltages from synchronous rectifiers 30 and 32 are differentially amplified by differential operational amplifier 38, which automatically eliminates any d.c. voltage from the pre-amplifier 28. The output of operational amplifier 38 is connected to a suitable indicator 40, with only voltage variations synchronous with the carrier frequency resulting in the final analog signal and voltages at the other frequencies being rejected.

Figure 3G:
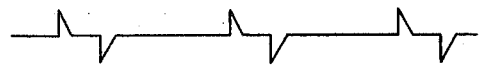
Figure 3H:
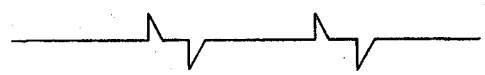

In accordance with an important feature of the invention the outputs of AND gates 34 and 36 are connected to corresponding synchronous rectifiers 30 and 32 through respective isolation networks comprising a pulse transformer 42 and a bistable multivibrator 44, and a pulse transformer 46 and a bistable multivibrator 48, as illustrated. It has been discovered that the spurious signals which produce non-zero readings for zero flow are the result of undesirable coupling between the cuff coil circuits, i.e., field current supply circuit 10 and the cuff electrode circuits, i.e., pre-amplifier 18 and demodulator 19. This coupling is eliminated by utilizing two separate and isolated power supplies 50 and 52. The connections between the power supplies 50 and 52 and the elements they power are indicated in dashed lines to avoid confusion with the connections described above and, as indicated, power supply 50 is exclusively connected to components of the cuff coil circuits and power supply 52 is exclusively connected to components of the cuff electrode circuits. In accordance with an important feature of this aspect of the invention, isolation between the two circuits is maintained by pulse transformers 42 and 46. Pulse transformers 42 and 46 are preferably of the closely coupled toroid type having a low turn secondary and pass only high frequencies. Transformers 42 and 46 serve to differentiate the input pulses thereto thereby producing two one-microsecond output pulses for each entering pulse as shown at FIGS. 3(g) and 3(h). The bistable multivibrators 44 and 48 restore the pulses from the pulse transformers 42 and 46, respectively, to their original wave shapes. Hence, the output wave forms shown at FIGS. 3(e) and 3(f) also accurately represent the wave forms at the outputs of bistable multivibrators 44 and 48.

The system of the invention is not only battery operated but requires no provision for zero balancing. By eliminating all zero controls, the transducer and amplifiers can be switched for different experiments without using zero references. This feature is of particular importance for long term chronic experiments of many months duration or when experiments are continually run over periods of days. Further, in addition to these advantages as well as those accruing from the small size and lower power requirements thereof, the system also provides other advantageous features. The use of low noise pre-amplifiers enables the entire system to be operated at much lower power levels and since less power is provided to the field coils of the transducer 14 such effects as drying of the tissue and other deleterious physiological effects associated with heated coils are eliminated. Due to the battery operation, the use of solid state circuitry and the minimum thermal effects produced, it is possible to turn on the equipment and start taking accurate data immediately. This contrasts favorably with many commercial units for which an extensive warm-up time is recommended. Delays introduced by such warm-up drifts can significantly complicate studies requiring periodic sampling of hemodynamic data such as would occur with circadian rhythm experiments, studies over long periods of time where intermittent sampling of data are required or studies involving an animal in his natural habitat or at a remote location.

Although the present invention has been described with reference to an exemplary embodiment thereof, those skilled in the art will understand that numerous variations and modifications in this exemplary embodiment may be effected without departing from the scope and spirit of the invention.

I claim:

1. An electromagnetic flowmeter system comprising a flow transducer for producing an electrical output signal in accordance with sensed flow and including at least one coil for generating an electromagnetic field in the area in which flow is to be sensed, a field current supply circuit for supplying current to said at least one coil; a demodulation circuit for converting said electrical output signal to a further, flow indication signal; a first power supply for said field current supply circuit; a second power supply for said demodulation circuit separate from and isolated from said first power supply circuit; said demodulation circuit comprising first and second synchronous rectifiers, said field current supply circuit including synchronizing means for producing synchronized gating signals for said synchronous rectifiers and said system further comprising pulse transformer means connected between said synchronizing means and said synchronous rectifiers for isolating said field current supply circuit from said demodulation circuit.

2. An electromagnetic flowmeter system as claimed in claim 1 wherein said field current supply circuit includes an astable multivibrator and a bistable multivibrator connected to the output of said astable miltivibrator.

3. An electromagnetic flowmeter system as claimed in claim 2 wherein said synchronizing means comprises first AND gate having a first input connected to a first output of said astable multivibrator and a second input connected to a first output of said bistable miltivibrator and a second AND gate having a first input connected to a second, 180° phase spaced output of said astable miltivibrator and a second input connected to a second, 180° phase spaced output of said bistable multivibrator.

4. An electromagnetic flowmeter system as claimed in claim 2 wherein said flow transducer comprises an air core type flow transducer.

5. An electromagnetic flowmeter system as claimed in claim 2 wherein said pulse transformer means comprises first and second pulse transformers, said system further comprising first and second bistable multivibrators individually connected to the outputs of said pulse transformers for restoring the wave shapes of the pulses entering the pulse transformers.

6. An electromagnetic flowmeter system as claimed in claim 5 wherein said pulse transformers convert an incoming pulse to first and second pulses of one-microsecond duration.

7. An electromagnetic flowmeter system as claimed in claim 2 wherein said transducer includes a plurality of electrodes and said demodulation circuit includes a differential pre-amplifier connected to said electrodes, one input of each of said synchronous rectifiers being connected to the output of said pre-amplifier.

8. An electromagnetic flowmeter system as claimed in claim 7 wherein said demodulation circuit further comprises a differential operational amplifier connected to the outputs of said synchronous rectifiers.

9. An electromagnetic flowmeter system as claimed in claim 8 wherein said field current supply circuit includes a power amplifier connected between said bistable multivibrator and said at least one coil.

* * * * *